Figure 1:
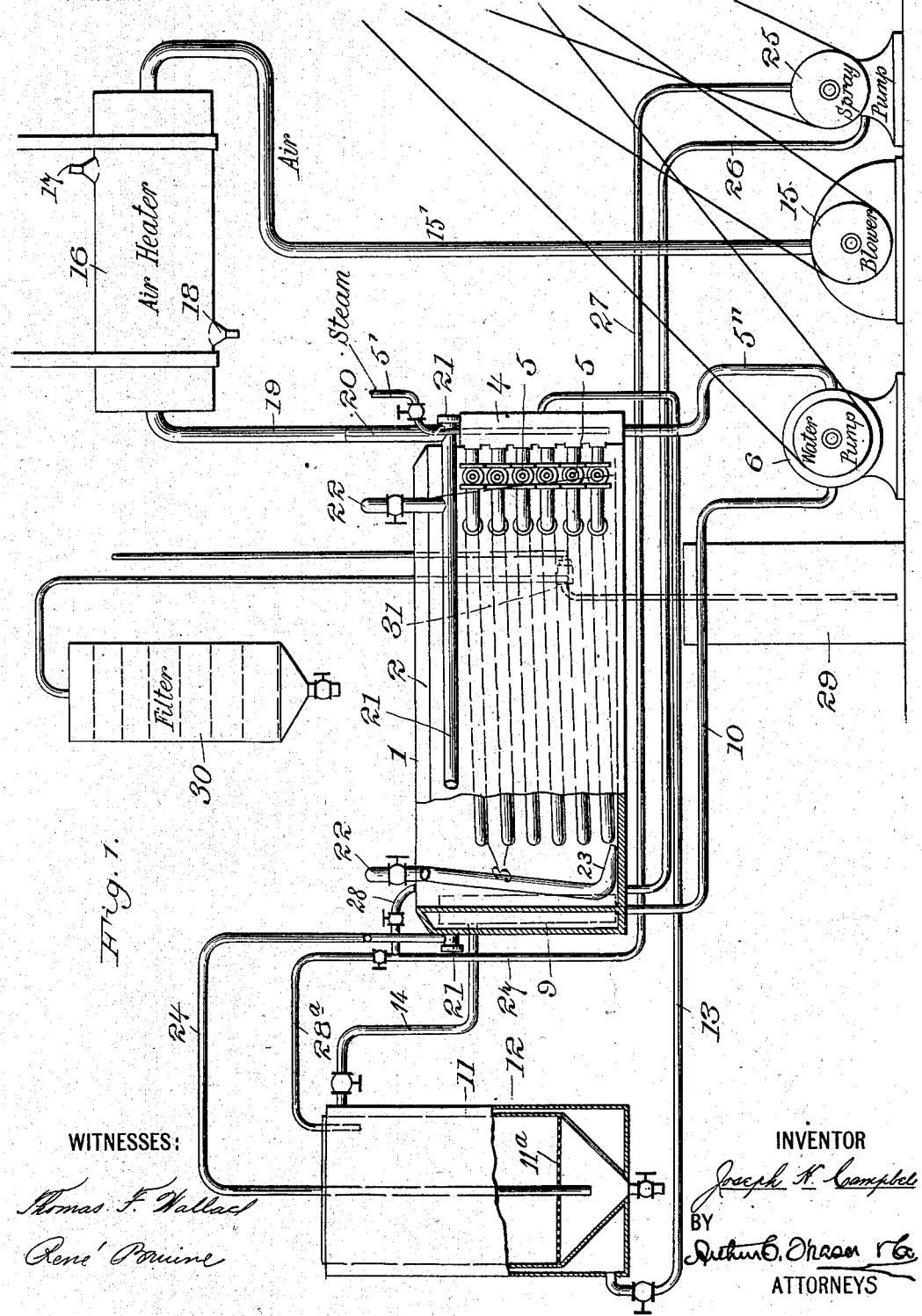

No. 717,968. PATENTED JAN. 6, 1903.
J. H. CAMPBELL.
PROCESS OF TREATING MILK AND PRODUCT THEREOF.
APPLICATION FILED JULY 21, 1899.
NO MODEL. 2 SHEETS—SHEET 1.

WITNESSES:
Thomas F. Wallace
René Bouine

INVENTOR
Joseph H. Campbell
BY
Arthur E. Ohson & Co.
ATTORNEYS

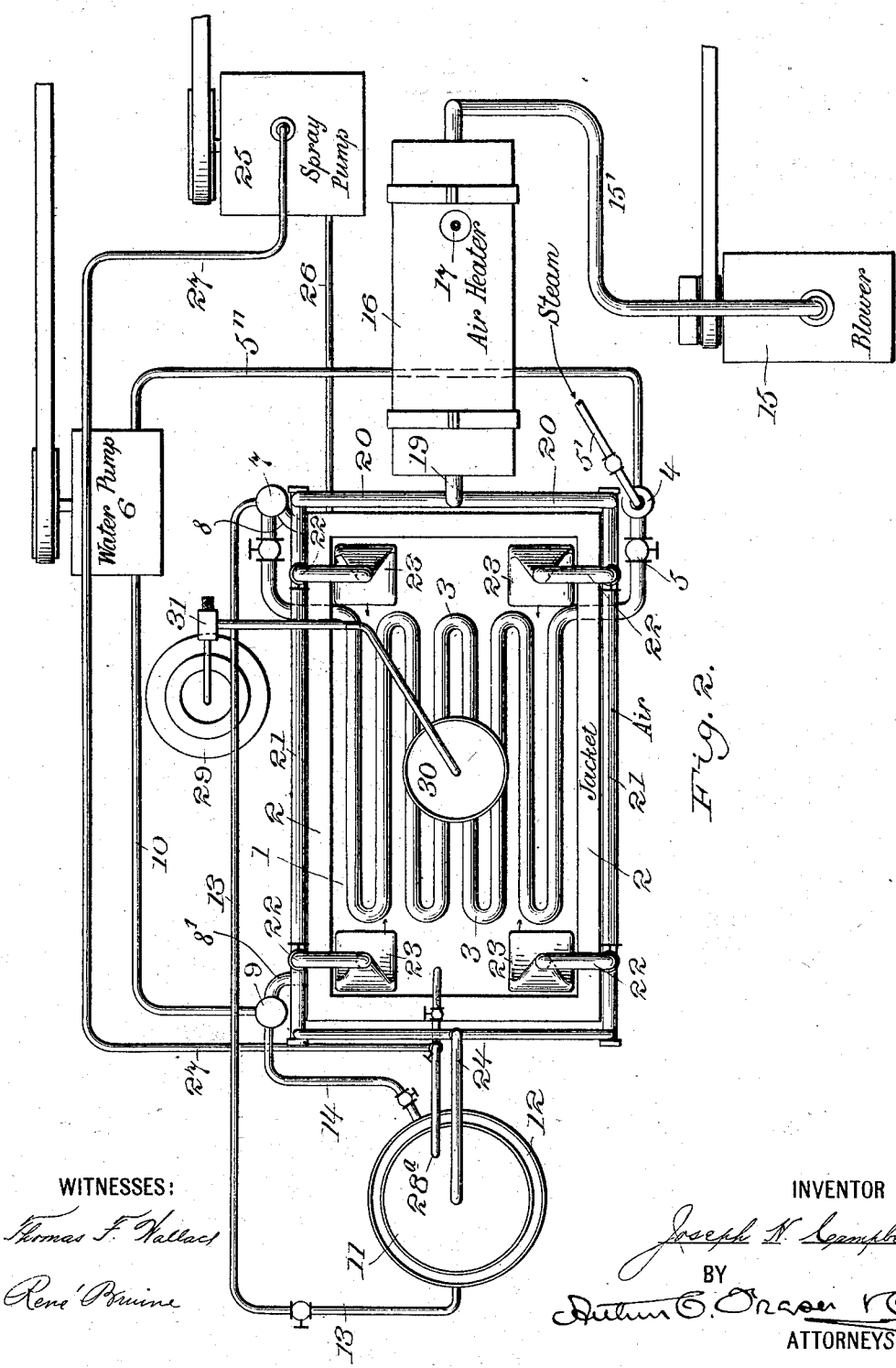

UNITED STATES PATENT OFFICE.

JOSEPH H. CAMPBELL, OF NEW YORK, N. Y.

PROCESS OF TREATING MILK AND PRODUCT THEREOF.

SPECIFICATION forming part of Letters Patent No. 717,968, dated January 6, 1903.

Application filed July 21, 1899. Serial No. 724,646. (No specimens.)

*To all whom it may concern:*

Be it known that I, JOSEPH H. CAMPBELL, a citizen of the United States, residing in the city, county, and State of New York, have invented a certain Process for the Treatment of Milk and a New Food Product Resulting Therefrom, of which the following is a specification.

My invention relates to the treatment of milk, such as ordinary cows' milk, for the production of a concentrated product containing the solids of the milk (casein, milk-sugar, and mineral and other constituents) in soluble form suitable for convenient use and to the product of such treatment.

According to my present invention I combine with milk a considerable proportion of fatty or oleaginous matter which is intimately incorporated therewith and concentrated to form a composition having preferably the consistency of a batter. This product, although suitable for other uses, is especially designed for the use of bakers as a substitute for butter, eggs, sugar, and milk.

Cows' milk varies somewhat in composition, the following analysis being fairly representative: fat, 3.50; casein and other albuminoids, 4.75; milk-sugar, 4; ash, .17; other solids, .71; total solids, 13.13; water, 86.87; total, 100.

In operating according to my invention I employ "skim-milk," partly because of its cheapness and partly because if unskimmed milk were used the butterine left in the resulting product or batter would render it and breadstuffs made from it liable to become rancid. Deducting the fats from the above analysis would leave of the original one hundred pounds of milk 94.5 pounds of skimmed milk, containing 9.63 pounds of solids or 10.19 per cent. In practice, however, I find that scarcely more than nine per cent. of solids exists in ordinary skimmed milk. These non-fatty solids consist of milk-sugar, proteids, and mineral matters, the latter including potash, soda, lime, magnesia, phosphoric acid, and chlorin. Of the proteids casein is the principal one, amounting in weight to nearly four per cent. of normal milk, although other proteids, notably albumen and galactin, are present, aggregating nearly one per cent. To one hundred pounds of skimmed milk I add, by preference, ten pounds of alimentary oleaginous matter, such as hogs' lard or cotton-seed oil. I then concentrate the milk at a low temperature, although sufficiently warm to maintain the fluidity of the oily matter, and in contact with the air, while maintaining a continual agitation such as to thoroughly incorporate the oily matter with the milk and produce a thoroughly homogeneous and well-aerated mass. The concentration and agitation are continued preferably until the product reaches the consistency of spongy batter. The resulting product will then have approximately the following composition:

9 parts milk solids, or, say. 26 per cent.
10 parts oils, or, say........ 29 per cent.
16 parts water, or, say...... 45 per cent.

35 parts ................... 100 per cent.

This new product or batter contains all the albuminoids, milk-sugar, mineral matters, and other solids of the milk, except its original fats which were removed in the cream. The fatty matter which has been added to the milk has been so thoroughly incorporated with it and rendered so soluble that the product is a thoroughly homogeneous mixture. The air taken up during the agitation is well dispersed in minute bubbles occluded throughout the mixture, making it light and well adapted for use with other materials with which it is to be mixed. This product or batter affords a cheap and suitable substitute for an equivalent combination of butter, eggs, sugar, and milk, and when used in baking in place of eggs and shortening imparts at decreased expense the same qualities and food values to the bread, crackers, or other products made therefrom as if butter, eggs, sugar, and milk were used. As thus used, ordinarily one pound of this batter is equivalent to one dozen eggs (weighing one pound) and to one pound of butter and also to some sugar and milk.

In order to effect the concentration of the milk while maintaining a continual agitation, I blow air into the liquid to be concentrated, so that the air shall circulate through the liquid and take up moisture therefrom. By this means I am able to effect a rapid evaporation at a very low temperature. The drier the air the more rapid is the evaporation, and I may provide means for drying the air before it is forced into the liquid; but this is not ordinarily necessary, as atmospheric air unless exceptionally humid is sufficiently dry. This method of evaporation has the important advantage where applied to milk that the evaporation may readily be performed at a temperature so low as to involve no coagulation of the albumen. A further advantage of this method is the retention of the proteids in a condition of undiminished solubility and peptogenic properties as compared with the raw milk. By "peptogenic" I mean capable of forming or yielding peptones, (*Standard Dictionary*.) In this peptone-yielding quality the proteids in my product are of substantially the same susceptibility as in ordinary fresh milk in the condition in which it is commonly supplied to consumers. The evaporation is expedited by operating at somewhat above ordinary temperatures, and I prefer a temperature approximating 100° Fahrenheit. In applying this evaporating process with milk there is some liability that the bubbles of injected air may not readily disengage themselves from the liquid, so that foaming results. In such case I break the foam by projecting against it a spray of the liquid by forcing the liquid under pressure through a spray-nozzle. The features of the process for evaporating milk thus described form by themselves a distinct invention which have been made the subject of a separate patent, (Patent No. 668,161, dated February 19, 1901.)

As applied to my present process the evaporation of the milk by introducing air thereinto, as just described, constitutes an important step. In addition to evaporating the milk so as to reduce the product to the desired density it has the following important advantages: First, the blast of air projected into the liquid keeps it in constant circulation and promotes a most thorough admixture of the fatty or oily matter with the milk; second, the air has an oxidizing effect upon the fatty acids, whereby a part of the insoluble fatty acids are rendered soluble, so that they are in turn dissolved in the water of the milk; third, the air increases the viscosity of the oil and causes it to incorporate more readily with the milk—that is, the particles or minute globules of oil are rendered colloid, and thereby caused to adhere to or amalgamate with the particles of casein in the milk; fourth, it obtains in the resulting product a spongy light consistency due to the permeation of the product by minute imprisoned air-bubbles, whereby it may be easily and intimately mixed with the dough or the like in which it is to be used; fifth, the air has also the effect of increasing the solubility of the proteids of the milk.

As the oleaginous matter I may employ either hog's lard, or cotton-seed oil, or sesame oil, or any other oily matter having analogous properties. The oil or fatty matter may be added to the milk before the concentrating process has begun or at any time before this process has proceeded too far—that is, it must be added before the milk "pearls;" but as nothing is gained by delaying its introduction I prefer to introduce the oil at or before the beginning of the concentrating process.

Having now indicated the nature of my invention I will proceed to describe in detail what I believe to be the preferable way of practicing my invention upon a commercial scale, and for this purpose I will refer to the accompanying drawings, which illustrate a suitable form of apparatus adapted for use in this process. The apparatus here shown is applicable also for other uses and will be made the subject of a separate application for patent, (application Serial No. 46,225, filed February 6, 1901,) so that no claim is made to it as part of my present invention.

Figure 1 of the drawings is a side elevation of said apparatus. Fig. 2 is a plan thereof.

Referring to the drawings, let 1 designate a main tank having a jacket 2 and having heating-coils 3 3 therein. Steam or hot water is supplied from a stand-pipe or header 4 to one, two, or more of the coils as controlled by valves 5 5. Steam from a suitable source is delivered by pipe 5', which discharges within the pipe 4 near its bottom. Water is introduced into this pipe from a pump 6 by pipe 5", and the entering water is heated by the steam. The water after passing through the coils 3 3 enters a second like pipe or header 7, from which the greater portion of the water flows through a short pipe 8 into the jacket 2 of the tank, and from this jacket it passes out by pipe 8' into a third header or stand-pipe 9, from which a pipe 10 conducts it back to the pump 6. Thus a continuous circulation of water of suitable temperature is maintained through the coils and jacket of the tank. A second or supplemental tank 11 is provided, having a jacket 12 and supplied with hot water through a valved pipe 13, a pipe 14 leading the water back to the stand-pipe 9.

A blower 15 is provided, which forces air under pressure through a pipe 15' into an air-heater 16, which may be heated by steam admitted at 17 and the water of condensation drained off at 18. The hot-air-outlet pipe 19 from this heater leads to branch pipes 20, and thence to pipes 21, extending along the sides of the tank 1. From these pipes lead branches or goosenecks 22, which extend down within the tank and terminate in flat nozzles 23, placed at the ends of the tank at or near the bottom thereof and each adapted to direct the air toward the opposite end of the tank. Another air-supply pipe 24 leads from the pipes 21 into the auxiliary tank 11 and terminates therein beneath a perforated diaphragm or false bottom 11ᵃ. A spray-pump 25 is also provided, which draws milk from the bottom of the tank 21 by pipe 26 and forces it through a pipe 27, which has a branch air-nozzle 28 for throwing spray into the tank 1 and another branch air-nozzle 28ᵃ for throwing spray into the tank 11.

29 designates a tank for receiving the milk to be treated. 31 is a steam-siphon or other lift-pump for elevating the milk therefrom to a filter 30, the latter being located above the main tank 1. This filter may be packed with sand and fibrous material.

I will now describe the process as performed by this apparatus.

The milk to be treated is first placed in tank 29, from which it is drawn by the injector 31 and discharged into the filter 30. The steam which is thus commingled with the milk serves to dilute it and to heat it. I heat it preferably to 100° Fahrenheit, or thereabout, the temperature being readily controllable according to the relative amounts of steam and milk admitted to the filter. In passing through the filter the milk is freed from all solid impurities and is discharged into the main tank. In this tank the milk thus heated, diluted, and filtered is first treated with a small amount of alkaline solution, preferably one-half an ounce or less of bicarbonate of soda to one hundred pounds of milk, or about sufficient to restore to the milk the alkaline properties it had when fresh. The object of heating and diluting the milk is to separate the particles of casein, prevent their becoming flocculent, and render them soluble by the action of the water and the air-blast in the subsequent stages of the process. The heat also intensifies the action of the alkali, which tends to render the casein soluble and keep it so. The hogs' lard, cotton-seed oil, or other oleaginous substance is then added in proportion of about ten pounds thereof to one hundred of milk. In the case of hogs' lard it may be melted, if desired, before adding it to the milk; but if not the warmth of the milk will soon render it fluid. Throughout the process the proper temperature, approximating 100° Fahrenheit, is maintained by the circulation of hot water in the coils 3 3 and jacket 2 of the tank, the temperature being regulated by admitting more or less steam through the pipe 5'. After adding the oily matter the air-blast is turned on by opening suitable valves in the air-pipes, the blower having been previously started. The air is thus forced into the milk through the nozzles 23, and the air subdivides into bubbles which sweep along the bottom of the tank and rise through the mass of milk, thereby setting up a rolling motion thereof and escaping therefrom, with the effect of violent ebullition. The entire mass is thus maintained in agitation and the contained water of the milk is taken up as vapor into the bubbles of air and carried off. The air also oxidizes part of the insoluble fatty acids of the oils and renders them soluble, so that they are dissolved in the contained water of the milk. The air also has the effect of increasing the density and viscosity of the oils and promoting their combination with or adherence to the casein or albuminous matter of the milk. The oil appears to form a coating for the particles of casein, which protects them against oxidation or other chemical change. As the process is continued the evaporation greatly reduces the volume of milk under treatment, and the process may be stopped at any desired degree of concentration. In case during this concentrating process any objectionable degree of foaming occurs the spray-pump 25 may be set in operation and spray from the nozzle 28 directed over or into the top of the tank to break up the foam and liberate the air. After the liquid in the tank has been reduced to a suitable consistency, preferably to about fifty per cent. of its original volume, it is transferred to the auxiliary tank 11, where it is further reduced by continuing the same process to a suitable consistency for the market, preferably that of a thick spongy batter. This transfer is not essential and is resorted to solely as a convenience in order to continue the treatment of the reduced bulk of material in a smaller tank and leave the larger tank free for treating a fresh batch of material, and also in order that in working the thicker or more concentrated material a tank may be used which does not contain the internal heating-coils 3 3 and air-discharge nozzles 23, which obstruct the interior of the larger tank and would interfere with the drawing off of the thicker product. In this auxiliary tank the temperature is maintained by circulating hot water through the jacket 11, and the evaporation is continued by introducing air through the pipe 24 beneath the perforated partition 11ᵃ, so that the air bubbles up through the perforations in this partition, and if too much foaming results spray is admitted through the pipe 28ᵃ.

My process may be modified somewhat without departing from my invention. Thus the preliminary heating and dilution of the milk may be omitted. The resulting product, however, lacks somewhat in richness and fineness of quality, but not sufficiently to destroy its usefulness. The further concentration effected after the thorough incorporation of the oleaginous matter with the milk has been effected is not essential, and such further concentration is resorted to solely for improving the marketability of the product. The proper incorporation of the oleaginous matter to form with the milk a homogeneous liquid will ordinarily have been effected by the time the liquid mass has been reduced to about fifty per cent. of its original volume, and the product may in this condition be withdrawn and sold and used, if desired; but in practical manufacture it is preferable to continue the concentration until the product becomes a thick spongy batter or paste.

My invention is not limited to the exact proportions herein definitely stated, but these proportions may be varied within reasonable limits ascertainable by experiment without thereby departing from my invention; but the proportions stated are those which I have found in practice to give the best results. The heating of the air in my process is not necessary and may be omitted, the necessary heat to restore that radiated from the liquid and abstracted by evaporation being supplied wholly through the medium of the jacket 2 and heating-coils 3.

I claim as my invention the following-defined novel features, substantially as hereinbefore specified, namely:

1. The process of treating milk which consists in adding oleaginous matter to it, and evaporating and agitating to incorporate the oleaginous matter and form a homogeneous mixture.

2. The process of treating milk which consists in adding oleaginous matter to it, and blowing air into the liquid to evaporate it and agitate it and thereby incorporate the oleaginous matter and form a homogeneous mixture.

3. The process of treating milk which consists in adding oleaginous matter to it, and blowing air into the liquid while maintaining it heated to a temperature below the coagulating point of albumen, to evaporate and agitate it and form a homogeneous mixture.

4. The process of treating milk which consists in adding oleaginous matter to it, and blowing air into the liquid while maintaining it heated, until the mixture is rendered homogeneous and is concentrated to approximately half of its original bulk.

5. The process of treating milk which consists in rendering it slightly alkaline, adding oleaginous matter, and blowing air into the liquid to render it homogeneous and to concentrate it.

6. The process of treating milk which consists in diluting and heating the milk, rendering it slightly alkaline, adding oleaginous matter to it, and then blowing air into it to render it homogeneous and concentrate it.

7. The new food product herein described, the same consisting of an aerated mixture of concentrated milk solids and alimentary oleaginous matter intimately incorporated together, the solubility and peptogenic properties of the milk solids being undiminished.

In witness whereof I have hereunto signed my name in the presence of two subscribing witnesses.

JOSEPH H. CAMPBELL.

Witnesses:
ARTHUR C. FRASER,
THOMAS F. WALLACE.